(12) United States Patent
Matsumoto et al.

(10) Patent No.: US 8,778,565 B2
(45) Date of Patent: Jul. 15, 2014

(54) MATERIAL FOR SOLID OXIDE FUEL CELL INTERCONNECTOR, UNIT CELL FOR SOLID OXIDE FUEL CELL, AND SOLID OXIDE FUEL CELL

(75) Inventors: Mineaki Matsumoto, Tokyo (JP); Hiroshi Tsukuda, Tokyo (JP); Shigenori Koga, Tokyo (JP); Norihisa Matake, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 601 days.

(21) Appl. No.: 12/766,957

(22) Filed: Apr. 26, 2010

(65) Prior Publication Data

US 2010/0323266 A1  Dec. 23, 2010

(30) Foreign Application Priority Data

Jun. 18, 2009 (JP) ................................ 2009-145015

(51) Int. Cl.
*H01M 8/00* (2006.01)
*H01M 8/24* (2006.01)

(52) U.S. Cl.
USPC ............................ 429/535; 429/400; 429/465

(58) Field of Classification Search
USPC .......................................... 429/465, 400, 535
See application file for complete search history.

(56) References Cited

U.S. PATENT DOCUMENTS

2006/0153974 A1* 7/2006 Matsuzaki et al. ............ 427/115

FOREIGN PATENT DOCUMENTS

| JP | 09-263961 A | 10/1997 |
| JP | 11-054137 A | 2/1999 |
| JP | 2000-048837 A | 2/2000 |
| JP | 2001-52725 A | 2/2001 |
| JP | 2004-139856 A | 5/2004 |
| JP | 2007-005200 A | 1/2007 |
| JP | 2008-108647 A | 5/2008 |
| JP | 2008-270203 A | 11/2008 |

OTHER PUBLICATIONS

A Decision to Grant a Patent for corresponding Japanese application No. 2009-145015, dated Jun. 11, 2013.
Office Action as issued on Mar. 26, 2013 in corresponding Japanese Patent Application No. 2009-145015 of which priority is claimed.

* cited by examiner

*Primary Examiner* — Matthew Merkling
(74) *Attorney, Agent, or Firm* — Benjamin J. Hauptman; Manabu Kanesaka

(57) ABSTRACT

An interconnector material having a high degree of densification, a unit cell for a solid oxide fuel cell that has a high degree of gas tightness at the contact interface between the electrolyte and the interconnector, and a solid oxide fuel cell having superior reliability are provided in an inexpensive manner. A material for a solid oxide fuel cell interconnector, comprising $(Sr_xE_{1-x})TiO_3$ (wherein x satisfies $0.01 \leq x \leq 0.5$, and E represents one or more elements selected from the group consisting of La, Pr, Nd, Sm and Gd) and $Al_2O_3$, wherein the $Al_2O_3$ content relative to the $(Sr_xE_{1-x})TiO_3$ is not less than 2 mol % and not more than 10 mol %.

9 Claims, 6 Drawing Sheets

MATERIAL FOR SOLID OXIDE FUEL CELL INTERCONNECTOR, UNIT CELL FOR SOLID OXIDE FUEL CELL, AND SOLID OXIDE FUEL CELL

BACKGROUND OF THE INVENTION

1. Field of the Invention

The present invention relates to a solid oxide fuel cell in which a plurality of unit elements are formed on a support tube.

This application is based on Japanese Patent Application No. 2009-145015, the content of which is incorporated herein by reference.

2. Description of Related Art

In a typical structure for a cylindrical solid oxide fuel cell (SOFC), a plurality of unit elements are formed along the lengthwise direction of a support tube, and adjacent unit elements are linked via an interconnector. The term "unit element" describes an element prepared by sequentially stacking an anode, an electrolyte and a cathode on a porous support tube. Although the voltage from a unit element is small, the total voltage is increased by connecting a plurality of elements in series, thus generating a high output.

An interconnector is a material that electrically connects the unit elements. If the conductivity of the interconnector is low, then the extractable electrical power level decreases, and therefore the interconnector requires a high degree of conductivity. Generally, a $LaCrO_3$-based material is used as the interconnector material (for example, see Japanese Unexamined Patent Application, Publication No. Hei 09-263961). Further, the interconnector also performs the role of preventing mixing of the fuel and the air when a fuel gas is supplied to the interior of the support tube. Accordingly, a high level of gas tightness is required at the interface between the interconnector and the unit elements.

The $LaCrO_3$-based material disclosed in Japanese Unexamined Patent Application, Publication No. Hei 09-263961 exhibits poor sinterability, and therefore not only must a high firing temperature be employed, but the resulting sintered compact suffers from a low degree of densification. When producing a solid oxide fuel cell using a $LaCrO_3$-based material, because the firing temperature must be raised, the support tube undergoes densification. As a result, the support tube loses the ability to allow passage of the fuel, causing a deterioration in the output properties of the solid oxide fuel cell. On the other hand, if the firing temperature is kept low in order to prevent the densification of the support tube, then the densification of the $LaCrO_3$-based interconnector deteriorates. As a result, when a solid oxide fuel cell is produced, the fuel tends to leak through the interconnector, causing a reduction in the electric power generation efficiency of the fuel cell. Furthermore, when $N_2$ purging is performed in the case of an emergency, oxygen may penetrate through to the anode, causing oxidation of the anode that will result in cracking or the like.

In order to address these problems, other methods of producing the interconnector for a solid oxide fuel cell besides the co-sintering method mentioned above have been proposed, including electrochemical vapor deposition (EVD) methods and spraying methods, but both these types of methods result in increased production costs.

In a unit cell for a solid oxide fuel cell, if there is a large difference in the coefficients of thermal expansion for the interconnector material and the materials used for each of the layers within the unit elements, then tensile stress and/or compressive stress occurs at the contact interface between the interconnector and each of the layers of the unit elements, producing strain and worsening the gas tightness. For example, if fine gaps exist at the contact interface between the electrolyte and the interconnector, then this can cause a reduction in the electric power generation efficiency as a result of fuel leakage, and cracking or the like as a result of anode oxidation.

BRIEF SUMMARY OF THE INVENTION

The present invention has been developed in light of the above circumstances, and has an object of providing, in an inexpensive manner, an interconnector material having a high degree of densification, a unit cell for a solid oxide fuel cell that has a high degree of gas tightness at the contact interface between the electrolyte and the interconnector, and a solid oxide fuel cell having superior reliability.

In order to achieve the above object, the present invention adopts the aspects described below.

Namely, the present invention provides a material for a solid oxide fuel cell interconnector, comprising $(Sr_xE_{1-x})TiO_3$ (wherein x satisfies $0.01 \leq x \leq 0.5$, and E represents one or more elements selected from the group consisting of La, Pr, Nd, Sm and Gd) and $Al_2O_3$, wherein the $Al_2O_3$ content relative to the $(Sr_xE_{1-x})TiO_3$ is not less than 2 mol % and not more than 10 mol %.

According to the present invention, by using a $SrTiO_3$-based material within the interconnector material, the firing temperature can be reduced compared with that required for a $LaCrO_3$-based material. Further, by developing a $(Sr_xE_{1-x})TiO_3$ material that exhibits excellent sinterability, co-sintering can be used for a structure comprising stacked layers of the materials for the support tube, the anode, the electrolyte and the interconnector. In $(Sr_xE_{1-x})TiO_3$, x satisfies $0.01 \leq x \leq 0.5$, and E represents one or more elements selected from the group consisting of La, Pr, Nd, Sm and Gd. If x is less than 0.01, then the charge carrying capacity is low, meaning a high conductivity cannot be expected. If x is greater than 0.5, then formation of a high-resistance phase causes a reduction in the conductivity.

If an amount of $Al_2O_3$ within the aforementioned range is added to the $(Sr_xE_{1-x})TiO_3$, then the $(Sr_xE_{1-x})TiO_3$ and the $Al_2O_3$ react during the co-sintering, producing a liquid phase in an amount that corresponds to the $Al_2O_3$ content. This liquid phase penetrates between particles of the $(Sr_xE_{1-x})TiO_3$, causing reorientation, dissolution and re-precipitation of the particles, thereby promoting densification. In other words, this type of liquid phase sintering enables an increase in the densification of an interconnector produced via a co-sintering process.

If the $Al_2O_3$ content relative to the $(Sr_xE_{1-x})TiO_3$ is less than 2 mol %, then the amount of the liquid phase decreases, and the interconnector is unable to sinter to high density. In contrast, if the $Al_2O_3$ content relative to the $(Sr_xE_{1-x})TiO_3$ exceeds 10 mol %, then the strength of the interconnector deteriorates, and the reliability of the unit cell for the solid oxide fuel cell deteriorates significantly.

Furthermore, if the $Al_2O_3$ content exceeds 10 mol %, then the resistance of the interconnector itself tends to increase. Moreover, if the $Al_2O_3$ content exceeds 10 mol %, then the contact resistance at the interconnector/cathode interface tends to increase. Accordingly, the $Al_2O_3$ content relative to the $(Sr_xE_{1-x})TiO_3$ is not less than 2 mol % and not more than 10 mol %, is preferably not less than 2.5 mol % and not more then 7 mol %, and is more preferably not less than 3 mol % and not more than 5 mol %. If the $Al_2O_3$ content relative to the $(Sr_xE_{1-x})TiO_3$ is not less than 3 mol % and not more than 5 mol %, satisfactory densification can be achieved with no deterioration in the strength or conductivity.

A unit cell for a solid oxide fuel cell produced using the type of interconnector material described above exhibits improved gas tightness at the contact interface between the electrolyte and the interconnector.

By employing this type of unit cell, a highly reliable solid oxide fuel cell can be obtained which suffers minimal fuel leakage and is able to suppress oxidation of the anode when $N_2$ purging is performed.

The present invention enables a unit cell for a solid oxide fuel cell having an interconnector with high density to be produced using a co-sintering method. The unit cell for a solid oxide fuel cell that represents one aspect of the present invention exhibits favorable gas tightness at the contact interface between the electrolyte and the interconnector, and therefore fuel leakage can be reduced and oxidation of the anode can be suppressed. As a result, a solid oxide fuel cell having a high output and excellent reliability can be produced comparatively cheaply.

DETAILED DESCRIPTION OF THE INVENTION

A description of an embodiment of the present invention is presented below, with reference to the drawings.

Figure 1:
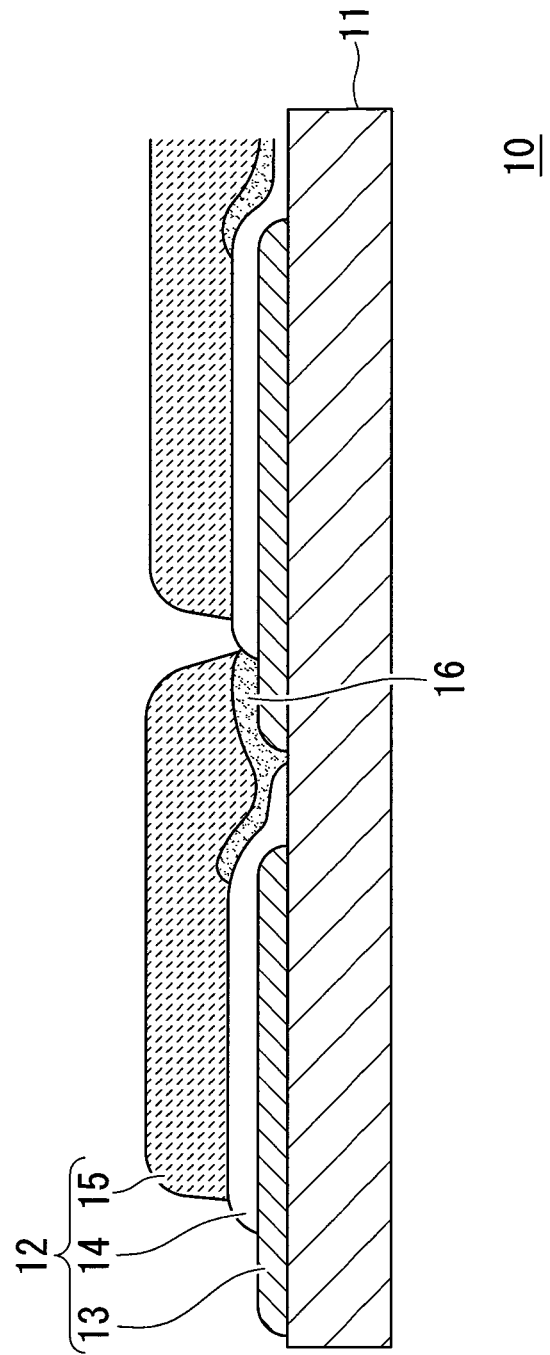
FIG. 1 is a schematic cross-sectional view of a unit cell of a cylindrical solid oxide fuel cell according to the present invention.

FIG. 1 is a schematic cross-sectional view of a unit cell 10 of a cylindrical solid oxide fuel cell according to this embodiment. A unit element 12 is formed by stacking an anode 13, an electrolyte 14 and a cathode 15, in that order, on a porous support tube 11. A plurality of the unit elements 12 are formed on the support tube 11, and adjacent unit elements are linked with an interconnector 16.

In the present embodiment, the support tube 11 is formed from CaO-stabilized $ZrO_2$, the anode 13 is formed from Ni/$Y_2O_3$-stabilized $ZrO_2$, and the electrolyte 14 is formed from $Y_2O_3$-stabilized $ZrO_2$, although there are no particular limitations on the materials used for the support tube, the anode and the electrolyte.

The interconnector 16 is composed of $Al_2O_3$ doped $(Sr_xE_{1-x})TiO_3$. The $Al_2O_3$ content relative to the $(Sr_xE_{1-x})TiO_3$ is not less than 2 mol % and not more than 10 mol %.

(1) Open Porosity of Interconnector

The method used for preparing a test piece for measuring the open porosity of the interconnector 16, and the method then used for measuring the open porosity are described below.

Powders of $(Sr_{0.9}La_{0.1})TiO_3$ (hereafter abbreviated as "SLT") and $Al_2O_3$ were used as raw materials. In the following description, the material used for forming the above interconnector is defined using the abbreviation SLT-An (wherein n is the $Al_2O_3$ content (mol %) relative to the SLT). Predetermined amounts of each of the raw materials for the interconnector material were weighed out, and these raw materials were then mixed for 10 hours by ball-milling. Subsequently, the dried mixed powder was molded and then fired for 0.1 hours in air at a temperature of 1,400±10° C., thus completing preparation of a test piece for measuring the open porosity of the interconnector 16.

The open porosity of the above test piece was measured by the Archimedes method in accordance with JIS R 1634.

Figure 2:
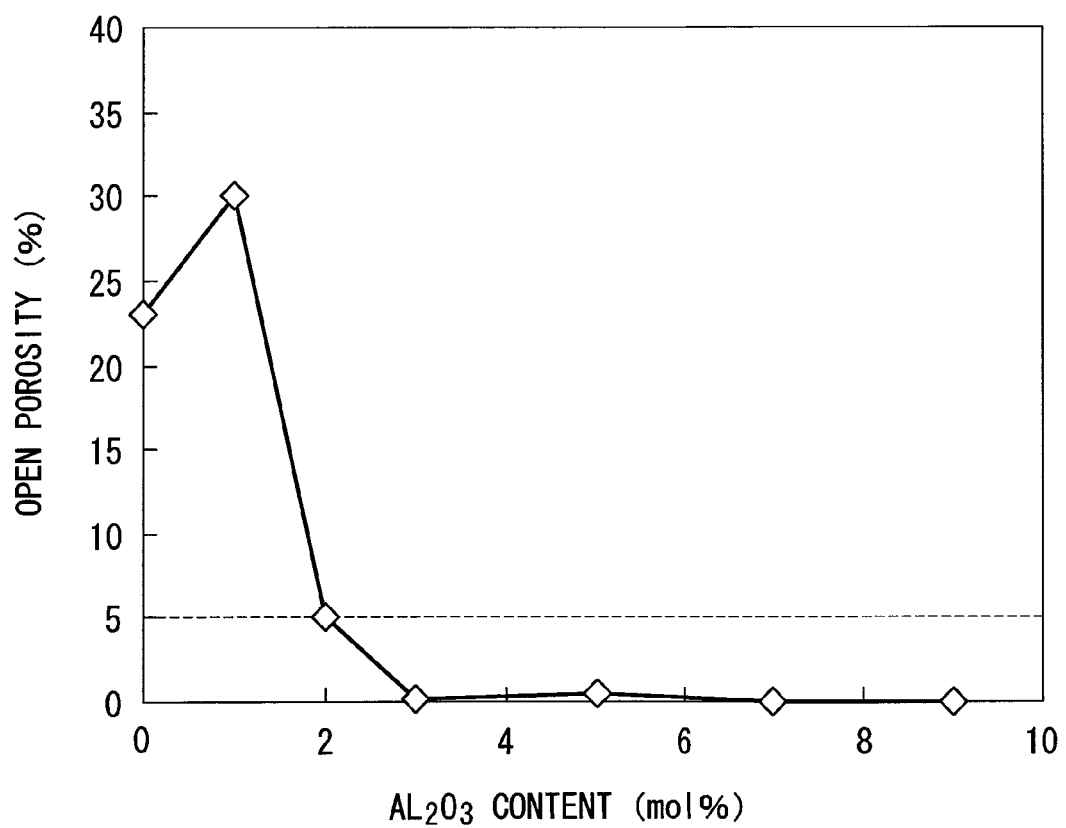
FIG. 2 is a graph illustrating the relationship between the $Al_2O_3$ content and the open porosity.

FIG. 2 is a graph illustrating the relationship between the $Al_2O_3$ content relative to the SLT and the open porosity. In this figure, the horizontal axis represents the $Al_2O_3$ content, and the vertical axis represents the open porosity. Test pieces with the $Al_2O_3$ content of 2 mol % exhibit a significant reduction in the open porosity compared with a test piece with no $Al_2O_3$ addition. The decrease in porosity to 5% means pore closure. When the $Al_2O_3$ content relative to the SLT reaches 3 mol % or greater, the open porosity falls to a value of not more than 0.5%. From the results in FIG. 2 it is evident that provided the $Al_2O_3$ content relative to the SLT is at least 2 mol %, an interconnector 16 with high density can be obtained. Moreover, if the $Al_2O_3$ content relative to the SLT is 3 mol % or greater, then an even higher density is obtained.

(2) Observation of the Surface Structure

FIG. 3A and FIG. 3B, and FIG. 4A through FIG. 4E show the surface structure of test pieces used for measuring the open porosity observed by scanning electron microscopy (×10,000 or ×1,000).

Figure 3A:
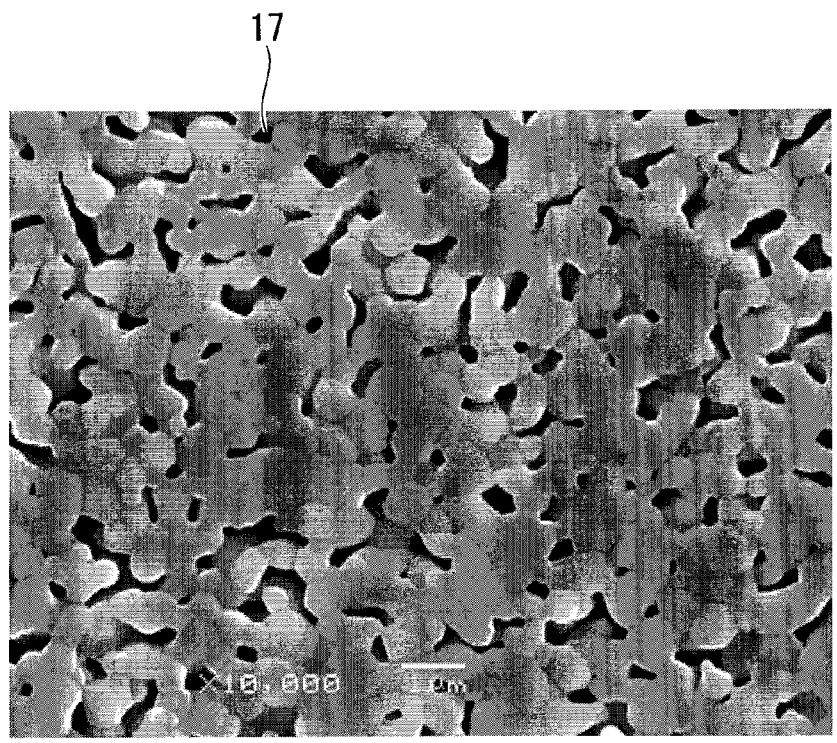
FIG. 3A is a photograph of the surface structure of a test piece used for measuring the open porosity.
Figure 3B:
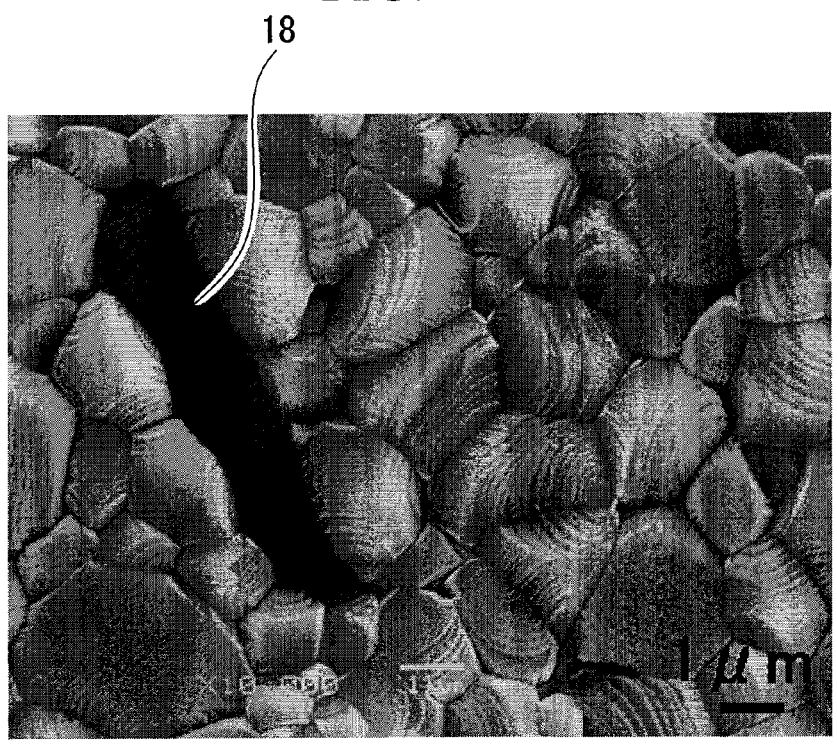
FIG. 3B is a photograph of the surface structure of a test piece used for measuring the open porosity.

FIG. 3A and FIG. 3B represent the surface structures of test pieces used for measuring the open porosity of SLT-$A_0$ and SLT-$A_5$ respectively. Numerous pores 17 are observed in SLT-$A_0$. In contrast, in SLT-$A_5$, the particle size has grown significantly, almost no pores 17 were observed, and needle-like particles 18 has been formed. X-ray diffraction identified these needle-like particles 18 as $SrAl_{12}O_{19}$. This $SrAl_{12}O_{19}$ is a high-resistance phase and also has a large particle size, and therefore will act as an origin for fracture, thus reducing the strength of the interconnector.

Figure 4A:
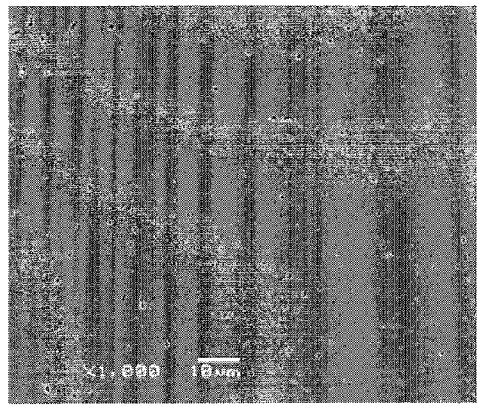
FIG. 4A is a photograph of the surface structure of a test piece used for measuring the open porosity.
Figure 4B:
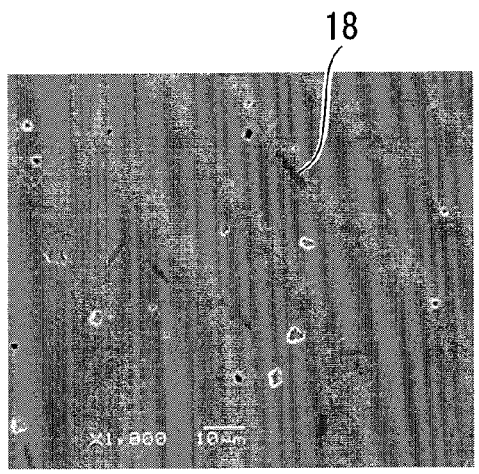
FIG. 4B is a photograph of the surface structure of a test piece used for measuring the open porosity.
Figure 4C:
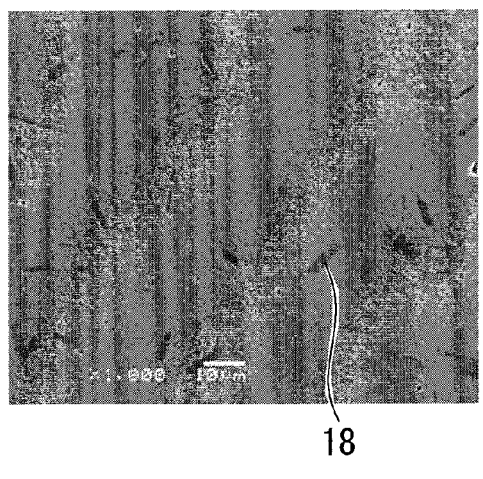
FIG. 4C is a photograph of the surface structure of a test piece used for measuring the open porosity.
Figure 4D:
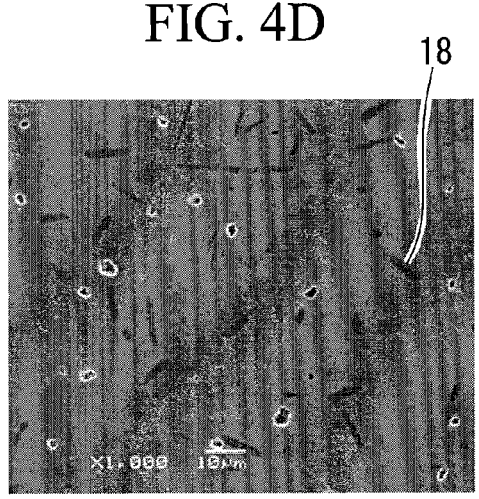
FIG. 4D is a photograph of the surface structure of a test piece used for measuring the open porosity.
Figure 4E:
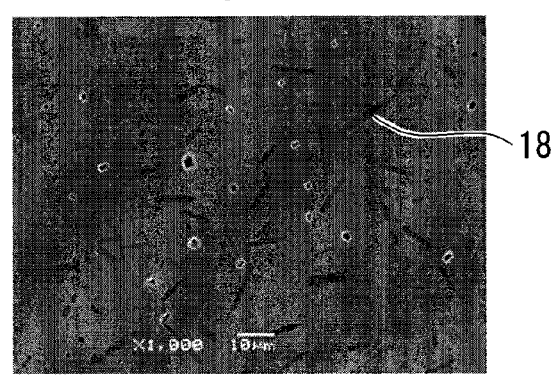
FIG. 4E is a photograph of the surface structure of a test piece used for measuring the open porosity.

The surface structures of other test pieces used for measuring the open porosity are illustrated in FIG. 4A for SLT-$A_0$, FIG. 4B for SLT-$A_3$, FIG. 4C for SLT-$A_5$, FIG. 4D for SLT-$A_7$ and FIG. 4E for SLT-$A_9$. In FIG. 4B to FIG. 4E, needle-like particles 18 similar to those of FIG. 3B are observed. The number of needle-like particles 18 increases with increasing $Al_2O_3$ content. Further, although not evident in the figures, liquid phase pools were observed in those test pieces containing 2 mol % or more of $Al_2O_3$. These results confirm that the liquid phase promotes sintering by penetrating between the SLT particles, thereby enhancing the densification of the interconnector 16 obtained by co-sintering.

The volume fraction of needle-like particles was calculated by image analysis.

Figure 5:
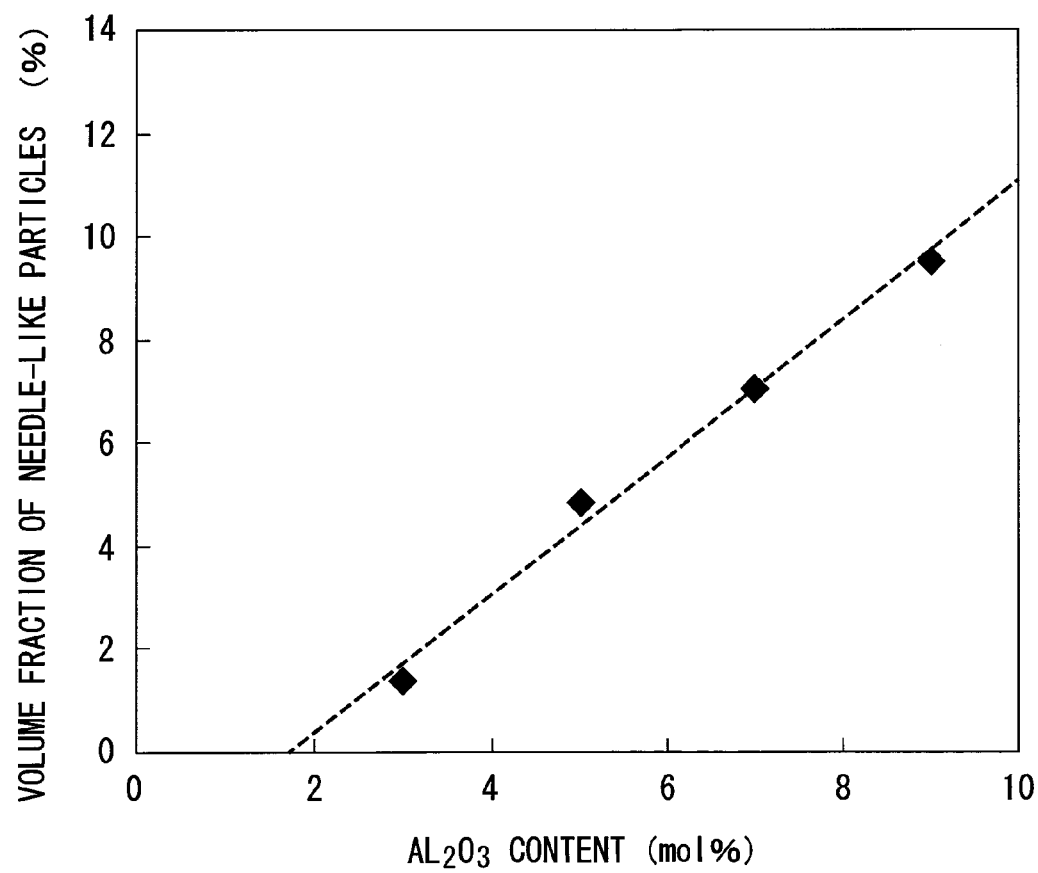
FIG. 5 is a graph illustrating the relationship between the $Al_2O_3$ content and the volume fraction of needle-like particles.

FIG. 5 shows the relationship between the $Al_2O_3$ content and the volume fraction of needle-like particles. In this figure, the horizontal axis represents the $Al_2O_3$ content, and the vertical axis represents the volume fraction of needle-like particles. The volume fraction of needle-like particles increases with increasing $Al_2O_3$ content.

Because these needle-like particles can act as fracture origins, an increase in the number of needle-like particles causes a reduction in the strength of the test piece. It was confirmed that the reduction in strength was about 10% when the $Al_2O_3$ content was 7 mol %, and 20% when the $Al_2O_3$ content was 10 mol %. A strength reduction exceeding 20% is undesirable from the viewpoints of the durability and reliability of the unit cell for a solid oxide fuel cell. Moreover, because the needle-like particles represent a high-resistance phase, the actual contact surface area of the interconnector/electrode interface decreases, resulting in increased contact resistance. This will have an adverse effect on the electric power generation performance of the solid oxide fuel cell. Based on the above results, the $Al_2O_3$ content relative to the SLT was specified as being not more than 10 mol %.

(3) Measurement of Densification Behavior

The method used for preparing a test piece for measuring the densification behavior is described below.

A 10 mol % $Y_2O_3$-stabilized $ZrO_2$ was used for the electrolyte, and SLT-$A_0$ or SLT-$A_5$ was used as the interconnector. Measurement of the densification behavior was conducted using a pushrod thermal dilatometer (for example, a horizontal thermal dilatometer TMA8360, manufactured by Rigaku Corporation). The measurement was executed using a temperature profile in which the temperature was raised from room temperature to 1,400° C. at a rate of 10° C./min, and then held at 1,400° C. for 4 hours.

Figure 6:
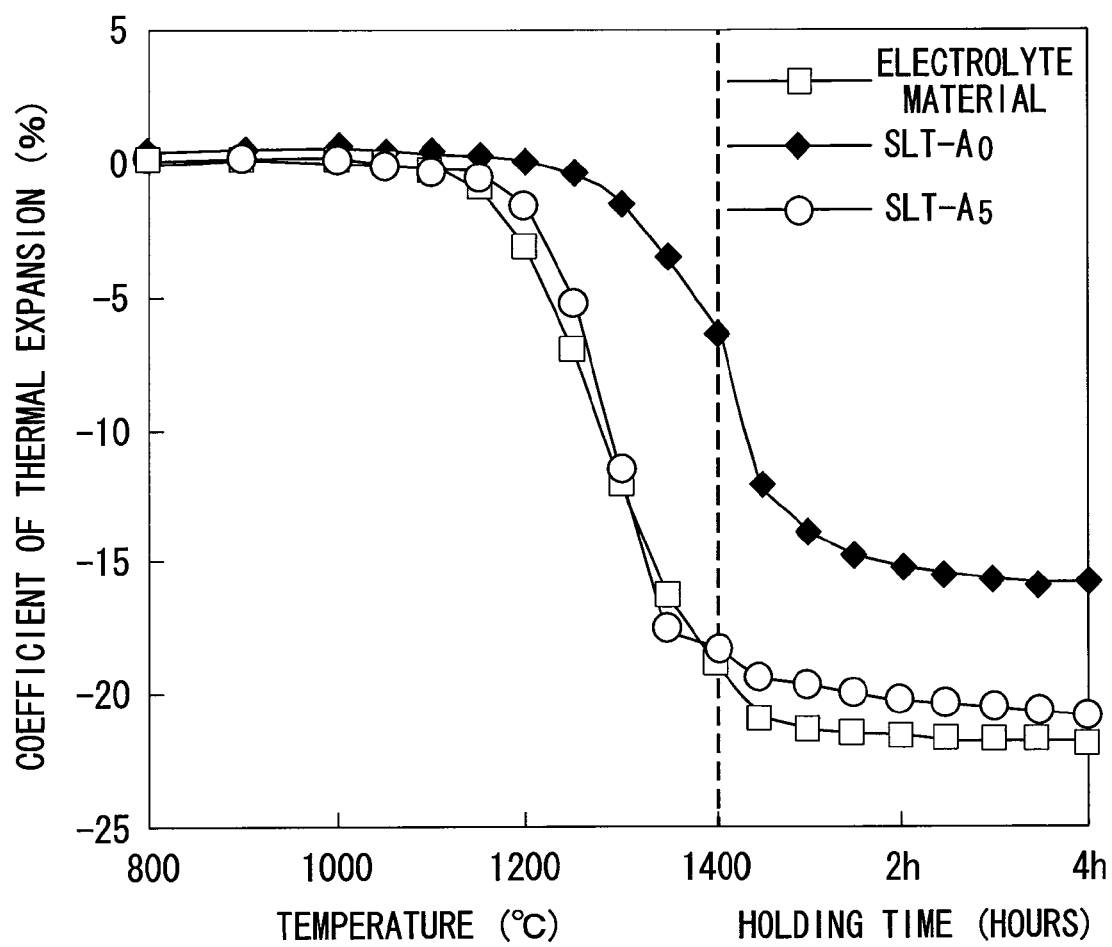
FIG. 6 is a graph illustrating densification behavior of materials.

FIG. 6 illustrates the densification behavior for each of the test pieces. In this figure, the horizontal axis represents the temperature and the holding time following the temperature increase, and the vertical axis represents the coefficient of thermal expansion.

For the SLT-$A_0$ test piece, the shrinkage start temperature is higher than that observed for the electrolyte, and the degree of shrinkage is also less. In contrast, compared with the SLT-$A_0$ test piece, the SLT-$A_5$ test piece exhibits a lower shrinkage start temperature, and the degree of shrinkage is larger. Moreover, the densification behaviors of the SLT-$A_5$ and the electrolyte are substantially identical. This indicates that the stress at the interface between the electrolyte and the SLT-$A_5$ during the co-sintering process is extremely small, which leads to increases in the density of both the electrolyte 14 and the interconnector 16, and an improvement in the gas tightness of the contact interface.

(4) Confirmation of Gas Tightness Between Elements

A method of preparing a sample used for confirming the gas tightness between elements wherein an interconnector is connected to the various layers of each unit element is described below.

A CaO-stabilized $ZrO_2$ support tube 11 was molded using an extrusion molding method.

An anode slurry was prepared using a mixed powder containing 60% by volume of NiO and 40% by volume of $Y_2O_3$-stabilized $ZrO_2$ as the anode material.

An electrolyte slurry was prepared using a powder of 10 mol % $Y_2O_3$-stabilized $ZrO_2$ as the electrolyte material.

An interconnector slurry was prepared using a powder of SLT-$A_0$ or SLT-$A_5$ as the interconnector material.

Using a screen printing method, the anode slurry, the electrolyte slurry and the interconnector slurry were deposited in sequence on the support tube 11. Subsequently, a co-sintering was conducted for 4 hours in air at a temperature of 1,400±10° C., thus forming a sample for confirming the gas tightness.

The thickness values for the anode layer, the electrolyte layer and the interconnector layer were 100 μm, 50 μm and 10 μm respectively.

Using the above samples for confirming the gas tightness, a solvent removable dye penetrant test (dye check) was performed, and the interconnector was inspected visually for macroscopic defects. The test agents used included, for example, a penetrant (product name: FP-S), a remover (FR-Q) and a developer (FD-S) (all manufactured by Taseto Co., Ltd.).

In the sample that used SLT-$A_0$, the interconnector/electrolyte interface was stained red, confirming the existence of defects caused by inadequate densification. However, in the SLT-$A_5$, no defects were confirmed. These results confirmed that $Al_2O_3$ addition improved the density of SLT interconnector 16 between elements.

(5) Open Porosity of Cell

The above samples used for confirming the gas tightness were cut to a predetermined size to observe a cross-section, and the open porosities of the electrolyte 14 and the interconnector 16 were measured in the same manner as (1) above.

The open porosity values for the electrolyte 14 and the interconnector 16 in SLT-$A_0$ were 6.9% and 6.1% respectively. In contrast, the two open porosity values in SLT-$A_5$ were 5.2% and 0.9% respectively. In other words, by doping $Al_2O_3$ in SLT, the open porosity was reduced not only for the interconnector, but also for the solid electrolyte membrane.

(6) Fuel Leak Rate

A fuel gas was supplied to the interior of the above sample used for confirming the gas tightness, and the rate of external fuel gas leakage was measured.

The fuel leak rate in the sample that used SLT-$A_5$ was reduced by approximately 70% relative to that observed for the sample that used SLT-$A_0$. This result confirms that doping $Al_2O_3$ in the SLT improves the gas tightness between elements, thereby enabling the production of a solid oxide fuel cell having a high level of electric power generation efficiency.

By using the interconnector material according to the present embodiment, a unit cell for a solid oxide fuel cell, having an interconnector 16 with a high degree of densification and a powerful adhesion at the contact interface between the electrolyte 14 and the interconnector 16 can be produced using a co-sintering method.

In the above tests, $(Sr_{0.9}La_{0.1})TiO_3$ was used as the $(Sr_xE_{1-x})TiO_3$ of the interconnector material, but the present invention is not limited to this particular material. Provided the interconnector material satisfies the compositional range represented by the formula $(Sr_xE_{1-x})TiO_3$, similar effects can be achieved.

What is claimed is:

1. A method for making a solid oxide fuel cell interconnector, comprising sintering a material for making a solid oxide fuel cell interconnector for a period of time and at a temperature sufficient to make $SrAl_{12}O_{19}$, wherein the material for making a solid oxide fuel cell interconnector comprises $(Sr_xE_{1-x})TiO_3$ (wherein x satisfies 0.01≤x≤0.5, and E represents one or more elements selected from the group consisting of La, Pr, Nd, Sm and Gd) and $Al_2O_3$, wherein the $Al_2O_3$ content relative to the $(Sr_xE_{1-x})TiO_3$ is not less than 2 mol % and not more than 10 mol % and wherein the sintering allows the following reaction:

$$(Sr_xE_{1-x})TiO_3 + \alpha Al_2O_3 \rightarrow Sr_{(x-\alpha/6)}E_{(1-x)}TiO_3 + (\alpha/6)SrAl_{12}O_{19} \qquad (A),$$

wherein α indicates $Al_2O_3$ content relative to the $(Sr_xE_{1-x})TiO_3$.

2. The method of claim 1, wherein the period of time is approximately 4 hours.

3. The method of claim 1, wherein the temperature is approximately 1400° C.

4. A composition made from sintering a material for making a solid oxide fuel cell interconnector, comprising $(Sr_x E_{1-x})TiO_3$ (wherein x satisfies $0.01 \leq x \leq 0.5$, and E represents one or more elements selected from the group consisting of La, Pr, Nd, Sm and Gd) and $Al_2O_3$, wherein the $Al_2O_3$ content relative to the $(Sr_x E_{1-x})TiO_3$ is not less than 2 mol % and not more than 10 mol %, wherein the composition includes the products from the following reaction:

$$(Sr_xE_{1-x})TiO_3 + \alpha Al_2O_3 \rightarrow Sr_{(x-\alpha/6)}E_{(1-x)}TiO_3 + (\alpha/6) SrAl_{12}O_{19} \quad (A),$$

wherein α indicates $Al_2O_3$ content relative to the $(Sr_xE_{1-x})TiO_3$.

5. A method of making a solid oxide fuel cell interconnector, comprising
mixing an interconnector slurry comprising the composition of claim 4, an electrolyte slurry, and an anode slurry to form a mixture and thereafter
co-sintering the mixture for a period of time and at a temperature sufficient to make $SrAl_{12}O_{19}$.

6. The method of claim 1, wherein the period of time is approximately 4 hours.

7. The method of claim 1, wherein the temperature is approximately 1400° C.

8. A cell for a solid oxide fuel cell, comprising an interconnector containing the composition according to claim 4.

9. A solid oxide fuel cell stack, comprising the cell for a solid oxide fuel cell according to claim 8.

* * * * *